Jan. 16, 1962   R. G. LE TOURNEAU   3,016,633
EARTH WORKING MACHINERY
Filed Jan. 26, 1961

INVENTOR.
Robert G. LeTourneau
BY Wm. T. Wofford
Attorney

United States Patent Office 3,016,633
Patented Jan. 16, 1962

3,016,633
EARTH WORKING MACHINERY
Robert G. LeTourneau, P.O. Box 2307, Longview, Tex.
Filed Jan. 26, 1961, Ser. No. 85,038
4 Claims. (Cl. 37—129)

My invention relates to earth working machinery and more particularly to machinery for digging, loading, and unloading material such as earth, rock, ore, minerals, or the like.

The invention is especially applicable to machinery wherein a gear driven apron co-operates with the load container.

The general object of my invention is to provide improved apron operating structure for earth working machinery of the type wherein a gear driven apron co-operates with the load container.

Another object of my invention is to provide improved gear structure for the apron above-mentioned.

Another object of my invention is to provide effective gear structure for the apron above-mentioned, and yet with a significant saving of gearing material.

Another object of my invention is to provide effective gear structure for the apron above-mentioned which will not be clogged, jammed, or unduly stressed by the material being loaded.

Figure 1:
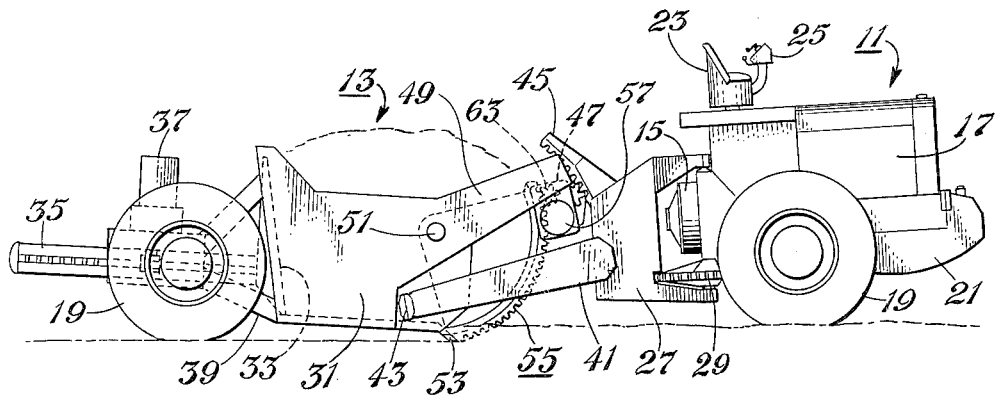
Figure 2:
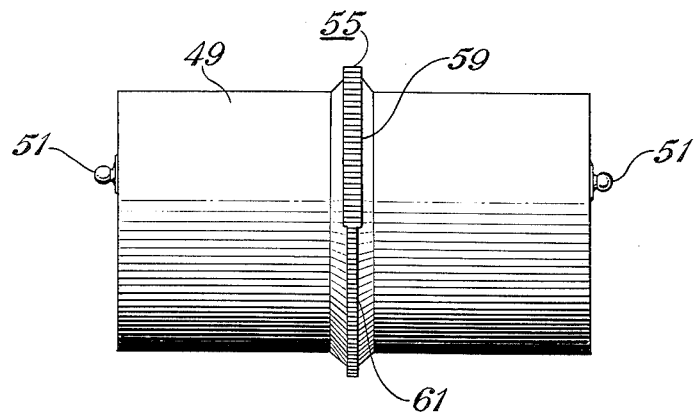

These and other objects are effected by my invention as will be apparent from the following description taken in accordance with the accompanying drawing, forming a part of this application, in which:

FIGURE 1 is a schematic side elevational view of an earth working machine in which my invention may be advantageously utilized; and FIGURE 2 is a schematic front elevational view of an apron incorporating my invention, the apron being a part of the machine shown by FIGURE 1.

The earth working machine shown by FIGURE 1 is a self-propelled digger, or scraper, of the type having a power plant unit 11 coupled in steerable relation to a digging and load handling unit 13.

The power plant unit shown includes an electric generator 15 driven by an internal combustion engine 17. The generator 15 supplies power to the wheels 19 of the earth moving machine, each wheel incorporating an electric motor driven gear reduction (not shown). The generator 15 also supplies power to motors which drive the various operating functions of the machine as will be presently described. The front wheels of the machine are fixed to a rigid axle (not shown) which is in turn fixed to the bed or frame 21 which supports the power plant. Fuel is carried within the frame 21 beneath the power plant. The operator's seat 23 and control station 25 is mounted atop the power plant above the generator 15. The operator's station 25 includes all controls for the machine. The power plant unit 11 is pivoted at its rear end on a yoke 27 at the front end of the load carrying unit 13. A steering sector gear 29 is fixed to and extends rearwardly of the power unit frame 21 and engages the output pinion of the steering motor (not shown) which is carried by the yoke 27.

The load carrying bowl 31 has a conventional configuration, open at the top, rear, and front. The usual tail gate 33 is slidable within the bowl 31, being powered by a tail gate rack 35, which is fixed by suitable brace structure to the tail gate 33. The rack 35 is supported by suitable guide structure (not shown) and is driven by an electric motor 37.

The bowl 31 is fixed by suitable bracing 39 to the rear wheel axle structure, and is pivoted at its sides as usual, on main pivot arms 41 which extend forwardly and upwardly from the pivot points 43 and are rigidly fixed at their forward end portions to the yoke structure 27. The yoke structure 27 also carries an arcuate bowl pivot gear sector 45 which extends upwardly and rearwardly therefrom and is rigidly fixed thereto. A bowl pivot motor 47 is fixed to the bowl structure and drives the bowl pivot gear sector 47 through a suitable gear reduction.

The load carrying unit 13 also carries the usual apron 49, which is pivoted to the upper forward portion of the bowl sides at pivots 51. The apron 49 is arcuate in vertical section, and is designed to provide a controlled closure for the bowl front. In the fully closed position, the lower edge of the apron 49 substantially abuts the front edge of the bowl floor, adjacent the digger blade 53.

An apron sector gear 55 is fixed to the front center portion of the apron 49 and follows the vertical section contour of the apron. The apron sector gear 55 is driven by an electric motor 57 through a suitable gear reduction, the motor and gear reductions being fixed to the upper forward bowl structure.

The essence of my invention resides in the structure and arrangement of the apron sector gear 55. As will be seen from FIGURE 2 of the drawings, the upper portion 59 of the apron sector gear 55 is wide, while the lower portion 61 has a greatly reduced width.

When the bowl 31 is loaded, there is a great weight and force exerted on the apron 49 by the load. Furthermore, the more nearly loaded the bowl 31, whether in the loading or unloading operation, the more nearly closed is the apron 49. In the loading operation, the apron position, of course, controls the size of the load receiving opening at the bowl front, and as the bowl 31 approaches full load, the apron 49 approaches the close position, and, of course, when the bowl is fully loaded, the apron is fully closed.

In the unloading or spreading operation, the bowl front opening is made such (by controlling the apron position) that the desired depth of spread is achieved.

To summarize, in all cases, the greatest load on the apron 49 is in the range of positions from fully closed to partially open. After the apron has reached the half-open position, the apron load is greatly decreased, and hence the load on the apron sector gear 55 is also greatly decreased.

From the foregoing it can be readily appreciated that an apron sector gear capable of carrying a heavy load is needed when the apron is in the region of closed to partially open, but a lighter apron sector gear would be adequate for the loads imposed in the region of fully open to partially closed.

In the normal operation of the earth moving machine, the lower front portion of the apron 49 necessarily comes into direct contact with the material being loaded. This is particularly so in the latter stages of a loading operation when the apron is nearly closed. At these stages there is usually a build-up of material being pushed ahead of the bowl 31. The lower portion of the apron 49 is in contact with such material, and the lower apron portion usually must pass through some of this bui'd-up for movement to its close position when the bowl has been loaded. Thus, in various ways, the apron lower portion and hence the apron sector gear lower portion 61 comes in contact with the material being loaded. This material tends to accumulate on the sector gear teeth, sometimes being compacted in the gear tooth valleys. This condition, of course, causes trouble when the apron sector gear drive pinion 63 engages the clogged sector gear teeth because the material build-up interferes with normal meshing of the gear 55 and pinion 63, imposing undesirable and often serious stresses on the gear and pinion as well as other parts of the apron drive mechanism. This condition is particularly serious when the sector teeth are wide, because then foreign material tends to stay put. However, if the sector teeth can be made relatively narrow, then the foreign material will to a great extent be squeezed out by the gear and pinion meshing action and difficulty thus greatly alleviated.

Thus, in accordance with my invention, the apron sector gear is made heavy and wide at its upper portion, 59, which must carry the heavy loads, and is made lighter and narrower at the lower portion 61 where the loads are relatively light, and where the foreign material is encountered and needs to be squeezed out.

While I have described the invention as applied to a self-propelled earth moving machine, it is apparent that the same principles may be applied to other types of similar material handling machines having aprons or their equivalent, for example, shovels and loaders.

The exact proportion of heavy or wide gear 59 to light and narrow gear 61 is not critical, the guiding principles being that the narrow gear should extend over the portion of the apron that normally comes in contact with the material being handled and can extend beyond that region to the point where the heavier and wider gear is needed to handle the loads imposed.

Also, if desired, the gear size could be reduced in two or more stages, instead of the single stage shown. Furthermore, if desired, a tapered side gear could be used, decreasing in width in the direction from top to bottom.

While I have shown my invention in only one form, it will be obvious to those skilled in the art that it is not so limited, but is susceptible of various changes and modifications without departing from the spirit thereof.

I claim:

1. In a self-propelled earth moving machine of the type comprising a load carrying bowl having an open front and an apron pivoted to the bowl sides and serving as a controllable closure for the front of said bowl, with said apron having an arcuate shape in vertical section, a sector gear fixed to said apron and extending outwardly therefrom along the apron surface vertical contour, a drive pinion engaging said sector gear to drive said apron through its range of positions from fully open to fully closed, with operator controllable means for driving said pinion; that improvement which resides in said sector gear, and wherein said sector gear has relatively light and narrow teeth in its lower portion which nomally contacts the material being handled and where the gear load is relatively light, and relatively heavy and wide teeth in its upper portion which does not normally contact the material being handled and where the gear load is relatively heavy.

2. In a material handling machine of the self-loading type comprising a load carrying bowl having an open front and an apron serving as a controllable closure for the front of said bowl, with said apron having an arcuate shape in vertical section, a sector gear fixed to said apron and extending outwardly therefrom along the apron surface vertical contour, a drive pinion engaging said sector gear to drive said apron through its range of positions from fully open to fully closed, with operator controllable means for driving said pinion; that improvement which resides in said sector gear, and wherein said sector gear has two or more sections with each section being lighter and having narrower tooth width than the section above it.

3. In a material handling machine of the self-loading type comprising a load carrying bowl having an open front and an apron serving as a controllable closure for the front of said bowl, with said apron having an arcuate shape in vertical section, a sector gear fixed to said apron and extending outwardly therefrom along the apron surface vertical contour, a drive pinion engaging said sector gear to drive said apron through its range of positions from fully open to fully closed, with operator controllable means for driving said pinion; that improvement which resides in said sector gear and wherein said gear is wider and heavier at its upper portion than at its lower portion.

4. In a material handling machine of the self-loading type comprising a load carrying bowl having an open front and an apron serving as a controllable closure for the front of said bowl, a sector gear fixed to said apron and extending outwardly therefrom along the apron surface vertical contour, a drive pinion engaging said sector gear to drive said apron through its range of positions from fully open to fully closed, with operator controllable means for driving said pinion; that improvement which resides in said sector gear, and wherein said sector gear has two or more sections with each section being lighter and having narrower tooth width than the section above it.

References Cited in the file of this patent

UNITED STATES PATENTS

| | | |
|---|---|---|
| 2,251,338 | McCollum | Aug. 5, 1941 |
| 2,280,439 | McLean | Apr. 21, 1942 |
| 2,395,334 | Lichtenberg | Feb. 19, 1946 |
| 2,846,788 | Vance | Aug. 12, 1958 |